Dec. 25, 1973     C. F. IRWIN     3,781,320
PROCESS FOR MANUFACTURE OF ORGANIC ISOCYANATES
Filed Feb. 9, 1971     3 Sheets-Sheet 1
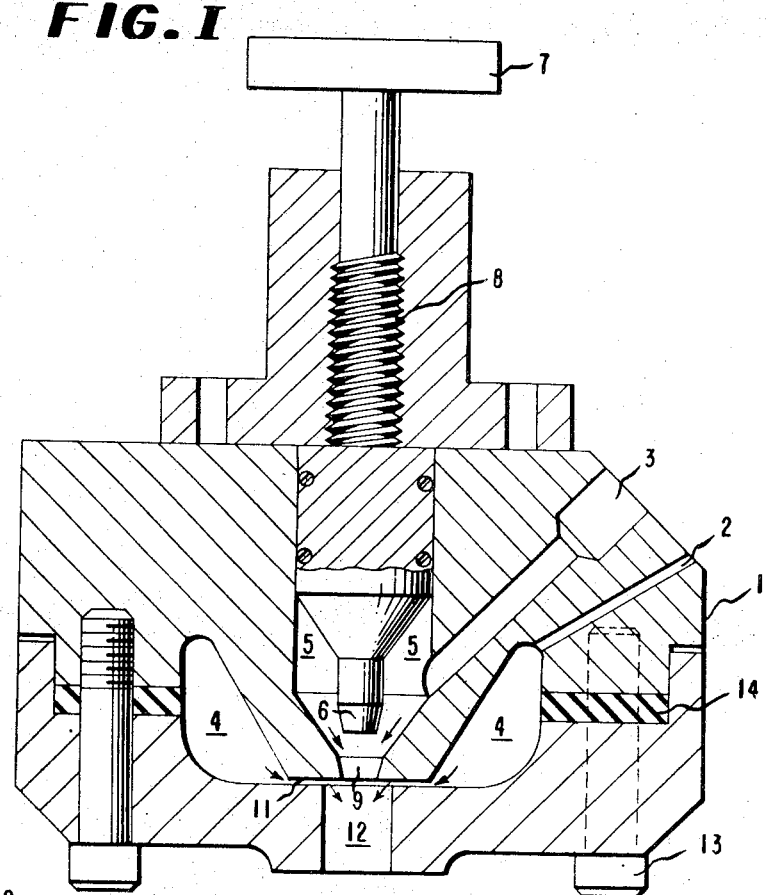
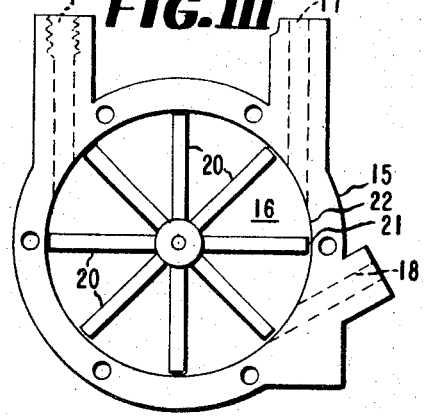
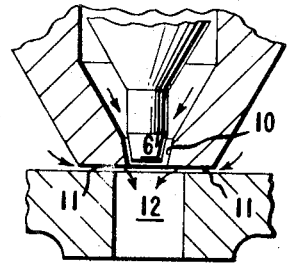
INVENTOR
CARL F. IRWIN
BY Melville J. Hayes
AGENT

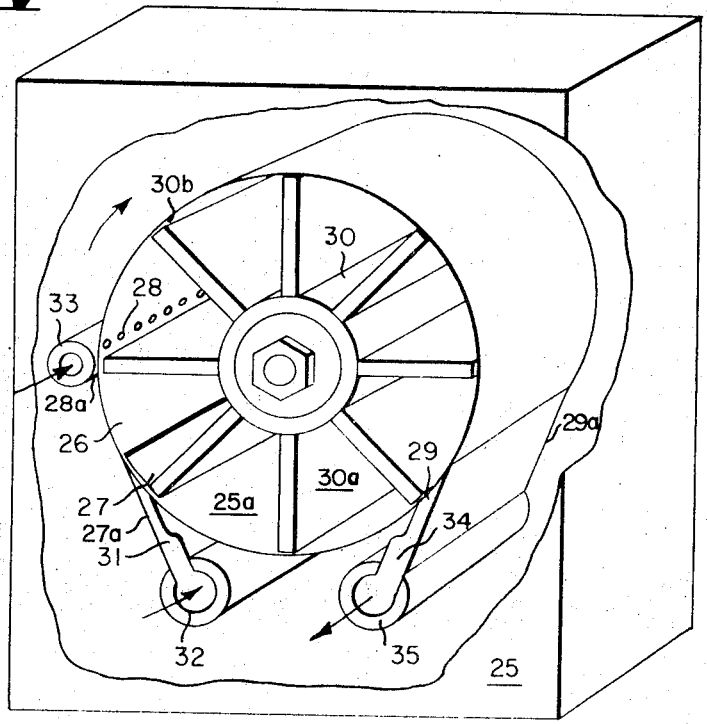
FIG. IV
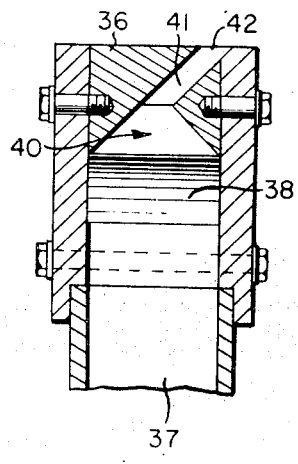
FIG. VI
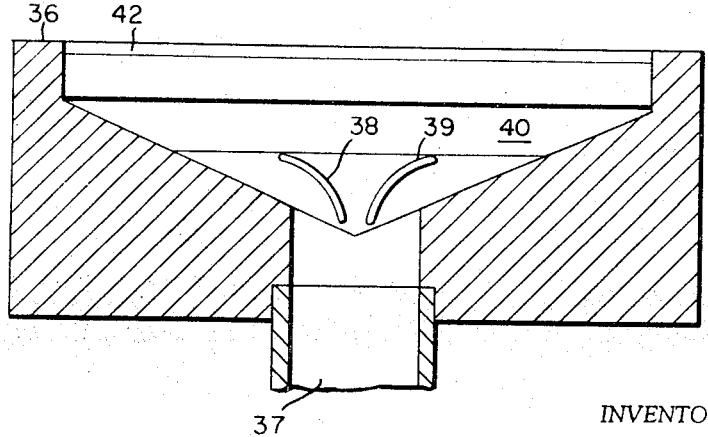
FIG. V

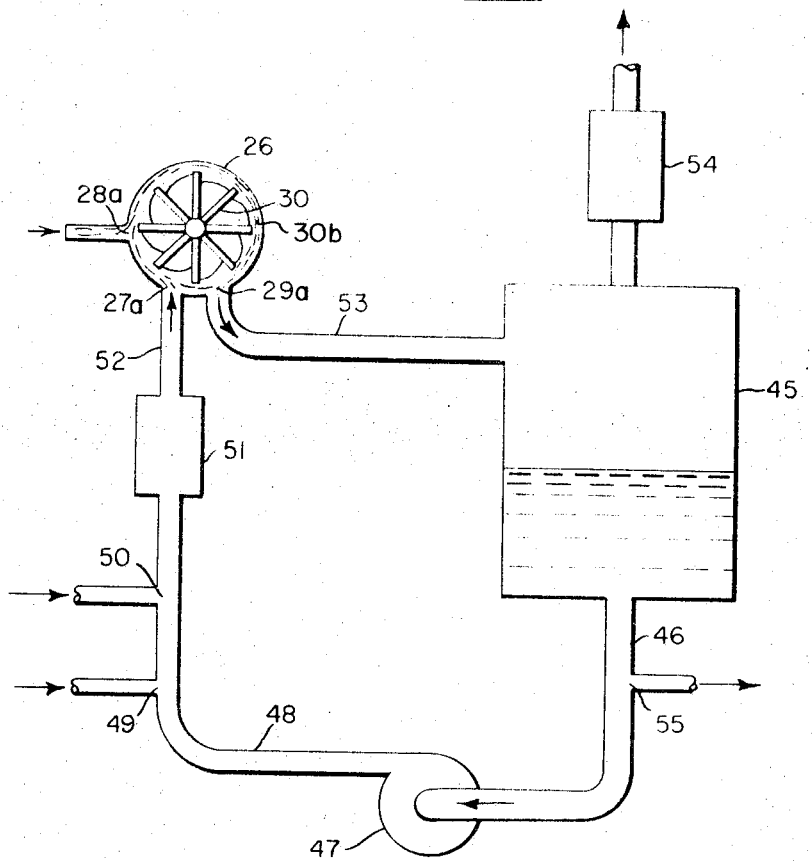

3,781,320
PROCESS FOR MANUFACTURE OF
ORGANIC ISOCYANATES
Carl F. Irwin, New Castle, Del., assignor to E. I. du
Pont de Nemours and Company, Wilmington, Del.
Continuation-in-part of abandoned application Ser. No.
846,210, July 30, 1969, which is a continuation-in-part of abandoned application Ser. No. 687,293, Dec. 1, 1967. This application Feb. 9, 1971, Ser. No. 113,939
Int. Cl. C07c 119/04
U.S. Cl. 260—453 PH                         22 Claims

ABSTRACT OF THE DISCLOSURE

Organic isocyanate compounds can be prepared with surprising efficiency by (a) continuously feeding to a suitable high-shear reaction zone an amine solution and a phosgene/isocyanate solution in specified proportions; (b) mixing the solutions under certain conditions of shear, pressure, and temperature while continuously moving them through the high-shear reaction zone until substantially all the amine has reacted with the mixture; (c) continuously removing the mixed and reacted material from the reaction zone (followed if desired by allowing the material to undergo further reaction while flowing to an isocyanate isolation means and/or recycling through the high-shear reaction zone); and (d) isolating isocyanate compound from the resulting material. An apparatus having beneficial utility in carrying out this process comprises a mixer which provides not only the inlet and outlet characteristics needed for a fast and efficient operation, but also an annular high-shear mixing zone formed between the tubular inner wall of a cylindrical vessel and the outer ends of the blades of a coaxial rotor rotating therein.

CROSS-REFERENCE TO RELATED APPLICATIONS

This application is a continuation-in-part of U.S. patent application Ser. No. 846,210 filed on July 30, 1969 now abandoned; the latter was a continuation-in-part of U.S. patent application Ser. No. 687,293 filed on Dec. 1, 1967, also abandoned.

BACKGROUND OF THE INVENTION

This invention relates to a process for preparing organic isocyanate compounds; it also relates to an apparatus for mixing fluids which is a highly preferred apparatus to use in practicing the present process.

It is well known in the art that organic isocyanate compounds can be prepared by reacting a suitable organic amine with phosgene. But the known isocyanate manufacturing methods are not capable of producing the isocyanate products with the speed, efficiency, and economy desired in many applications.

SUMMARY OF THE INVENTION

Expressed broadly, the present invention provides a process for preparing an organic isocyanate compound which comprises:

(A) Providing a solution in an organic solvent of an organic primary amine, the weight ratio of the amine to the solvent in the solution being about 5:95 to 50:50, (B) Providing a solution in an organic solvent of an enough phosgene and an isocyanate of an organic primary amine to provide the feed requirements of Step C given below.

(C) Continuously feeding to a reaction zone the amine solution provided in Step A and the phosgene/isocyanate solution provided in Step B in proportions such that for each part by weight of said amine being fed, there are fed at least 8 parts by weight of phosgene and about 25–150 parts by weight of the isocyanate, (D) While the contents of the reaction zone are at a temperature of about 85–180° C., while continuously moving the contents through the reaction zone, and while maintaining a phosgene partial pressure of about 3–100 p.s.i. absolute in the reaction zone, mixing the contents under high shear at a shear rate of at least 700 reciprocal seconds until substantially all of the amine has reacted with the mixture, (E) Continuously removing the resulting mixed and at least partially reacted material from the reaction zone, and (F) Isolating organic isocyanate compound from the removed material.

The invention also provides an apparatus for mixing fluids which comprises:

(1) A cylindrical vessel whose end walls and tubular side wall define a cylindrical chamber, (2) A rotor mounted for coaxial rotation within said chamber and having blades whose length is such that there is an annular space between the outer ends of the blades and the tubular inner wall of the vessel whose thickness is equal to about 0.1–20% of the diameter of said chamber during rotation of the rotor, (3) At least one inlet means for introducing fluids to be mixed into said annular space during rotation of the rotor, and (4) Outlet means for removing mixed fluids from said annular space during rotation of the rotor.

BRIEF DESCRIPTION OF THE DRAWINGS

The invention is illustrated in the attached drawings wherein:

FIG. I is a view in central vertical section of a mixer which can be used in the process of this invention; although it is not the mixer of this invention, it is used to illustrate an embodiment of the process.

FIG. II is a view of the central portion of the mixer of FIG. I wherein nipple component 6 has been lowered to operating position.

FIG. III is a view in vertical section across the width of a mixer of this invention which can be used in the present process.

FIG. IV is a perspective view of a preferred mixer of this invention with the left end wall removed; this mixer is very useful in carrying out the present process.

FIG. V is a view in central vertical section along the length of a preferred means for feeding liquid to the reaction zone of the FIG. IV mixer, especially useful as a replacement for feeding means 31/32 of FIG. IV when feeding phosgene/isocyanate solution according to the present invention.

FIG. VI is a view in central vertical section along the width of the feeding means shown in FIG. V.

FIG. VII is a flow diagram illustrating a preferred embodiment of the present process using the FIG. IV type of mixer in a continuous closed-loop operation.

DESCRIPTION OF PREFERRED EMBODIMENTS

In carrying out certain preferred embodiments of the process as described above in the Summary of the Invention, the material removed in Step E still contains ingredients capable of forming isocyanate compound, and prior to Step F said material is stored in a vessel at about 85–180° C. while covered with a gas having a phosgene content of about 1–100% by weight until additional organic isocyanate compound is formed. Preferably, at least some of the resulting stored material is subjected to conditions which cause hydrogen chloride removal, then the material is mixed with enough phosgene and solvent to form the Step B solution and Steps C, D, and E are repeated.

An important advantage of the process is that it can be carried out continuously, efficiently, and rapidly in a single closed loop, and the portions of the loop handling the liquid to be recycled can be kept at about the same temperature as the annular mixing zone when this is desired. In some embodiments, about 90–99% by weight of the material leaving the mixer outlet is sent back through the mixer, thereby increasing its isocyanate concentration; and about 10–20% by weight of the material flowing towards the outlet makes another pass through the reaction zone before flowing through the outlet. The amine reacts very quickly in the annular reaction zone with the phosgene to form intermediates, and these in turn form the isocyanate compound either before or after the mixture leaves the annular reaction zone. Some of the amine also reacts quickly with hydrochloric acid formed in the process and present in the mixture; this amine subsequently becomes available to react with phosgene through dissociation of the amine hydrochloride.

The high-shear mixing zone is used at least to initiate the formation of the isocyanate compound, it can also be used to complete the formation of the isocyanate, but in some of the best embodiments of the process this is done elsewhere. Thus, the material flowing from the mixer can be considered "at least partially reacted" with respect to isocyanate product formation.

The term "shear rate" in Step D refers to average shear rate; it is the linear velocity (calculated from flow rate and area for flow) of a moving layer of liquid at a given place divided by the depth of the liquid at that place. For purposes of the present invention, shear rate is measured at the place where the amine solution first contacts the phosgene/isocyanate solution. Thus, the shear rate obtained by operating with the apparatus of FIG. I is the fluid velocity of the phosgene/isocyanate solution, where it comes into contact with the amine solution, divided by the depth of the phosgene/isocyanate solution at that place. Similarly, the shear rate obtained by using the apparatus of FIG. III is the fluid velocity of the reaction solution surface (closest to the center of the cavity and which is usually about the same as the impeller tip velocity) divided by the gap between the impeller tip and the wall of the reaction cavity.

Solvents employed in this process are preferably chlorinated aromatic hydrocarbon solvents in which phosgene is relatively soluble under the pressures employed. Preferred solvents are those having lower boiling points than the particular isocyanates which are being prepared in order that the isocyanates will remain dissolved in the solution but can be readily removed therefrom by distillation of the solvents. Monochlorobenzene, o-dichlorobenzene, p-dichlorobenzene, trichlorobenzenes, corresponding toluenes and xylenes, chloroethylbenzene, monochlorodiphenyl and α- and β-naphthyl chloride are illustrative of the types which can be used. Because of its particularly useful boiling point, o-dichlorobenzene is a preferred solvent. Also useful are other organic solvents in which phosgene and the amine are relatively soluble under the pressures used and which do not undergo any harmful reactions with the other components of the reaction mixture under the process conditions used.

In Step C of the process, I usually prefer that the solutions be fed into a reaction zone composed of an annular high-shear mixing zone which is formed between the tubular inner wall of a cylindrical vessel and the outer ends of the blades of a coaxial rotor rotating therein. The annular mixing zone preferably has a thickness equal to about 0.15–10% of the inside diameter of the vessel, and the pressure in the vessel is about 15–150 p.s.i. absolute.

I prefer to feed at least one of the solutions specified in Step C into the reaction zone at a substantially uniform rate at numerous points along a narrow path in said tubular wall which is about 80–100% as long as said wall and substantially parallel with the rotor axis. The other solution is preferably fed in the same manner at another location in the tubular wall.

It is generally advisable to feed both of the solutions into the reaction zone in a direction within the range of radial to substantially parallel to a tangent on tubular wall at said narrow path in the direction of rotor rotation. I especially prefer to feed the solutions so that the amine solution is fed in a direction within the range of radial to an angle in the direction of rotor rotation of about 30 degrees to said tangent, and the phosgene/isocyanate solution is fed in the direction of rotor rotation and within the range of substantially parallel to said tangent to an angle of about 45 degrees to said tangent.

In some of the most useful embodiments of the process, the amine solution is fed to the reaction zone at a point located at an angular distance of about 10–90 degrees in the direction of rotor rotation from the point at which the phosgene/isocyanate solution is fed; and in Step E the material is removed from the reaction zone through a slot in the tubular wall which is about 80–100% as long as said wall, substantially parallel with the rotor axis, and located an angular distance of about 135–300 degrees in the direction of rotor rotation from the point at which the amine solution is fed.

The amine solution is preferably fed in such a manner that it enters into and rapidly mixes with the layer of liquid moving along the annular reaction zone. I prefer to feed the phosgene/isocyanate solution through a slot which defines a narrow path in the tubular wall as described above (80–100% as long as the wall and substantially parallel with the rotor axis).

I also prefer to carry out the process so that it has one or more of the following features numbered 1–10:

(1) The phosgene/isocyanate solution is fed at a rate equal to about 50–1000 (preferably about 100–250) times the rate at which the amine solution is fed.

(2) The amine solution is fed through a row of evenly-spaced equal-size ducts in the vessel wall which are in a narrow path in the tubular wall as described above. Also preferably these ducts have a diameter of about 0.03–0.25 inch; these are average inside duct diameters, therefore they are average amine stream diameters. The ducts for example can be holes drilled in the tubular wall, or tubes removably fitted into holes in the wall. I prefer to position the ducts so that the distance between the resulting streams of amine solution passing through the ducts is about 0.2–2.0 inches measured from center to center of adjacent streams. If the ducts are not circular, they are made of any other suitable shape and spacing to give about the same feed results.

(3) The amine solution has an amine to solvent weight ratio of about 10:90 to 35:65. The amine:solvent ratio is kept high enough to avoid the use of excessive amount of solvent, but not so high as to result in the formation of any undue amount of tarry by-product.

(4) The shear rate in Step D is at least 2000 reciprocal seconds. A shear rate of about 3000–7000 reciprocal seconds is especially preferred when using relatively highly concentrated solutions in Step C and high reaction zone temperature.

(5) The amount of phosgene fed in Step C is at least 15 parts per part of the amine. Up to about 6000 parts or more of phosgene per part of amine can be fed in some cases. The molar ratio of phosgene to amine in a FIG. VII type of loop is usually sufficient to provide at least a 50% stoichiometrical excess of the phosgene (at least 1.5 moles of phosgene) per NH group. A much greater excess of phosgene can be employed; the preferred range (e.g. with aromatic diamines) is between 70% and 200% excess of phosgene. It is seldom advisable to use an excess above 500%.

(6) The amount of isocyanate compound fed in Step C is about 75–125 parts per part of the amine.

(7) A phosgene partial pressure of about 8–25 p.s.i. absolute is maintained in Step D.

(8) The contents of the reaction zone are maintained at about 102–130° C. in Step D.

(9) The amine used in Step A is one or more of the following: toluene diamine, diamino diphenyl methane, and 4,4'-bis(aminocyclohexyl)methane.

(10) In Step C, one or both of the solutions is fed into the reaction zone at a pressure which is substantially uniform at all points along said path and is slightly above the pressure in the vessel.

In a preferred closed-loop operation as is shown in FIG. VII, the phosgene/isocyanate solution is preferably fed at a pressure which is just enough higher than the vessel pressure to maintain the necessary uniformity of feed for the particular application. This results in minimum power consumption at pump 47. A pressure drop from conduit to mixing zone of about 0.5–15 p.v.h. (pipe velocity heads) is preferred in many applications, with special preference for about 5–10 p.v.h. pressure drop.

It is also preferred in the FIG. VII type of closed-loop operation to maintain the mixture in the reaction zone and in other portions of the loop at a temperature above the decomposition temperature of the carbamyl chloride of the amine utilized; that is, at about 85–180° C. depending upon the amine used. A temperature of about 102–130° C. is preferred for most aromatic amines and about 90–120° C. for toluene diamine. However, 4,4'-bis(diamino cyclohexyl)methane is preferably reacted at about 150–175° C. Temperatures slightly above 180° C. can be used in a few applications. The low pressure zone in the process loop can be in the form of a jacketed reservoir in which the solvent is maintained at the desired reaction temperature; or recycled isocyanate solution can be passed through a heat exchanger before entering the high-shear reactor. Any solvent and/or phosgene removed from the mixture along with hydrogen chloride can be returned to the reservoir or introduced with fresh solvent on the high pressure side of the pump recirculating the isocyanate solution. When the process is carried out without recycling the isocyanate solution, the isocyanate and solvent can be removed directly from the reservoir to a suitable still.

In embodiments of the process where only iscyanate-forming intermediates are produced in the annular reaction zone, the completion of the isocyanate-producing reaction can be carried out: (a) in a storage portion of a closed-loop operating unit in which the storage means has the desired residence time and other conditions needed; (b) by passing the mixture through the same reaction zone again, for example, by means of a suitable pump; (c) by passing the mixture through another suitable continuous or batch reaction zone; and/or (d) by passing the mixture through a conventional isocyanate recovery or isolation process in which the mixture is subjected to conditions which convert the intermediates to isocyanate compound.

The process of this invention can be used to manufacture isocyanate compounds with beneficial speed, efficiency, and economy. A surprisingly high yield of isocyanate product can be obtained at a very high production rate. The amount of amine that reacts with the isocyanate remains uenxpectedly low even when much of the material leaving the mixer is recirculated back through the mixer in the FIG. VII type of operation. Also, the process permits relatively low solvent consumption.

The process is useful in the manufacture of isocyanates by reaction of amines with phosgene; it can be used to produce mono-, di-, and polyisocyanates from the corresponding mono, di-, and polyamines. The process is particularly useful for the reaction of phosgene with aromatic amines such as aniline, toluidine, benzidine, naphthyl amines, 2,4-tolylene diamine, 2,6-tolylene diamine, the phenylene diamines, 4,4'-diamino diphenyl methane, 1,5 - naphthalene diamine, 1 - amino - 3-(4-aminophenyl) propane, anisidine, chloroanilines, and the like. Aliphatic amines such as hexamethylene diamine, xylylene diamine, and 4,4'-bis(amino cyclohexyl)methane can be used to form the corresponding diisocyanates.

In certain embodiments of the mixing apparatus described above in the Summary of the Invention, it is preferred that the apparatus have one or more of the characteristics described in Items (a) through (u) below;

(a) The axis of the cylindrical vessel is substantially horizontal, and at least the outer end portion of each blade of the rotor is substantially parallel with the vessel axis. The word "substantially" is used to mean completely or almost completely. Any deviation from parallel of the portion of the blade that does the mixing should not be so great as to cause any harmful amount of movement of the material being mixed towards one or both end walls of the vessel.

(b) The width of said blades is such that there is a space between the edge of each blade, at least at its outer end, and the adjacent end wall of the vessel equal to about 0.05–10% of the length of said chamber.

(c) The annular space has a thicknses of about 0.15–10% of the chamber diameter, and said space between the edge of each blade and the end wall is about 0.1–5% of the chamber length.

(d) There are at least two of said inlet means, and at least one of them is a continuous feeding means capable of continuously feeding a fluid through said side wall into said annular space at a substantially uniform rate at numerous points along a narrow path in said side wall which is about 80–100% as long as said wall and substantially parallel with the rotor axis.

(e) Said continuous feeding means is comprised of (a) an orifice means in said side wall, (b) a distribution means outside the vessel, in communication with said orifice means, and capable of supplying all portions of said orifice means with fluid at substantially the same rate, and (c) conduit means for feeding fluid to the distribution means.

(f) Said orifice means is a means for introducing fluid into said annular space in a direction within the range of radial to substantially parallel to a tangent on the tubular wall at said narrow path in the direction of rotor rotation.

(g) Said distribution means is a plenum chamber for supplying all portions of the orifice means with fluid at a substantially uniform pressure slightly above the pressure within the vessel.

(h) There are two of said continuous feeding means, the second of which is located at an angular distance of about 10–90 degrees in the direction of rotor rotation from the first one; and at least the outer end portion of each rotor blade has a width substantially equal to the length of the narrow path of each fluid inlet.

(i) The outlet means of the mixer comprises an orifice means in said side wall located at an angular distance of about 135–300 degrees in the direction of rotor rotation from said second continuous feeding means.

(j) The outlet orifice means is a slot in said side wall which is about 80–100% as long as said wall and substantially parallel with the rotor axis, and it is capable of removing fluid from the annular space in a direction within the range of radial to substantially parallel to a tangent on the tubular wall at the slot in the direction of rotor rotation.

(k) The orifice means of the first continuous feeding means is a slot in said side wall which is about 80–100% as long as said wall and substantially parallel with the rotor axis. It is sometimes desirable to use a slot which is interrupted with one or more reinforcing ribs across its width and/or length.

(l) The slot of the first continuous feeding means is a means for introducing fluid into the annular space in the direction of rotor rotation and within the range of substantially parallel to a tangent on the tubular wall at said slot to an angle of about 45 degrees to said tangent.

(m) The orifice means of the second continuous feeding means is a row of evenly-spaced equal-size ducts which defines said narrow path in the side wall.

(n) Said row of ducts is a means for introducing fluid into the annular space in a direction within the range of radial to an angle in the direction of rotor rotation of about 30 degrees to a tangent on the tubular wall at said narrow path.

(o) The first continuous feeding means is enough larger than the second so that fluid can be fed through the first one at a rate equal to about 50–1000 times the rate of the second one.

(p) The ducts of said second means have a diameter of about 0.03–0.25 inch, and the center-to-center distance between adjacent ducts is about 0.2–2.0 inches.

(q) The rotor has about 2–12 blades per foot of vessel diameter, and the blades are substantially straight, radial, and rectangular.

(r) The cylindrical chamber has a length-to-diameter ratio of about 0.1:1 to 20:1; especially preferred is a ratio of about 1:1 to 5:1.

(s) The portion of the plenum chamber nearest the conduit has the general shape of a funnel whose small end is connected to the conduit means.

(t) The portion of the plenum chamber nearest the orifice means has the general shape of a funnel whose small end is connected to the orifice means.

(u) The plenum chamber contains baffle means for regulating the direction in which different portions of the fluid flow from the conduit means towards the orifice means so that all portions of the orifice means will feed fluid to the annular space at substantially the same rate.

The baffles can be replaced with or combined with other known means for insuring uniformity of flow through a plenum chamber orifice. For example, the plenum chamber can be shaped so that its width in the central portion is a predetermined amount less than the width at the end portions; its side walls can contain suitable fluid-directing recesses or protuberances; the pressure in the plenum chamber can be increased slightly; and/or a supplementary conduit can feed additional fluid at any desired pressure into any portion of the plenum chamber that needs it.

The mixing apparatus of this invention is very useful for the rapid and efficient mixing of two or more liquid materials, especially when it is desired to feed the liquids in specific proportions through separate inlets at any required angle into a high-shear mixing zone, to maintain certain reaction conditions in the mixing zone such as a specified temperature or pressure, and/or to recycle all or part of the material flowing from the outlet back through the reaction zone. The apparatus is especially useful in carrying out the process of this invention. It can also be used to mix liquids with gases or with finely divided solid materials such as pigments or fillers.

EXAMPLE 1

This example, and those that follow, illustrate the invention; all amounts are by weight unless otherwise indicated.

A preferred embodiment of the novel mixing apparatus is constructed as illustrated in FIG. IV; an end wall has been removed to show the mixer structure.

Referring to FIG. IV, mixer/reactor 25 has a cylindrical vessel whose end walls (left one removed) and tubular side wall 25a define cylindrical chamber 26 having a length of 9 inches and a diameter of 9 inches. Rotor 30 is mounted for coaxial clockwise rotation in chamber 26; and it has 8 blades 30a, or about 10½ blades per foot of diameter of chamber 26. The rotor is 8¾ inches long and its diameter is 8⅞ inches. There is a thin annular space 30b (also see 30b of FIG. VII) between the outer ends of the blades and the inner surface of tubular wall 25a during rotation of the rotor. The annular space has a thickness of 1/16 inch (measured radially from end of blade to wall 25a), or about 0.7% of the diameter of chamber 26.

Tubular wall 25a has inlet means 27a and 28a for introducing fluids to be mixed into space 30b during rotation of the rotor; and it has outlet means 29a for continuously removing a fluid mixture from space 30b during rotation of the rotor.

Each of the inlet means 27a and 28a is capable of continuously feeding a liquid into space 30b at a uniform rate at numerous points along a narrow path in wall 25a, each path being about as long as wall 25a and parallel with the rotor axis. Inlet means 27a is made up of slot 27, plenum chamber 31, and conduit 32, all about 9 inches long. Slot 27 is 0.375 inch wide; it introduces liquid into space 30b in the direction of rotor rotation parallel to a tangent on wall 25a at the slot. Inlet means 28a is made up of a row of 18 evenly-spaced equal-size ducts 28, plenum chamber 33, and a conduit (not shown) for feeding liquid into the chamber. Ducts 28, which introduce liquid radially into space 30b, have a diameter of ⅛ inch; the center-to-center distance between adjacent ducts is ½ inch. Outlet means 29a is made up of slot 29, chamber 34, and conduit 35, all about 9 inches long. Slot 29 is ½ inch wide; it removes liquid from space 30b in the direction of rotor rotation parallel to a tangent on wall 25a at the slot.

Plenum chambers 31 and 33 are built to supply all portions of each inlet orifice means with liquid at a predetermined uniform pressure. The row of ducts 28 is at an angular distance of about 45 degrees in the direction of rotor rotation (clockwise) from slot 27, and outlet slot 29 is at an angular distance of about 200 degrees clockwise from ducts 28.

The axis of the rotor is horizontal. Each blade along its width (from end to end of chamber 26) is parallel with the axis; and the width of each blade is about equal to the length of slot 27 and row of ducts 28. The clearance between the edge of each blade and adjacent vessel end wall is about ⅛ inch, or about 1.4% of the chamber length. Each blade is radial and rectangular, and straight along its length and width.

The Example 1 apparatus is useful in carrying out the process of this invention. It has the beneficial utility described in the paragraph just before Example 1, regardless of whether the materials to be mixed are fed at about the same rate or at widely different rates.

EXAMPLE 2

Another preferred embodiment of the novel mixing apparatus is constructed to have the features described in Example 1 except the plenum chamber 31 and conduit 32 of FIG. IV are replaced as described below with the liquid feeding means 36 shown in FIGS. V and VI.

Referring to FIGS. V and VI (and slot 27 of FIG. IV), plenum chamber 40 is built to supply all portions of slot 27 with liquid at a predetermined uniform pressure. Conduit 37 supplies liquid to chamber 40. It can be seen in FIG. V that the portion of chamber 40 nearest conduit 37 has the general shape of a funnel (or truncated rectangular pyramid) whose small end is connected to the conduit. And it can be seen in FIG. VI that the portion of chamber 40 that is nearest slot 27 (in the assembled apparatus) has the general shape of a funnel whose small end is connected to slot 27 when feeding means 36 is attached to the FIG. IV mixer so that liquid is fed through slot 27 in the direction specified in Example 1. Chamber 40 contains baffles 38 and 39 for regulating the direction of liquid flow from conduit 37 towards slot 27 so that all portions of the slot will feed liquid to space 30b at the same rate.

In the assembled and operating apparatus, the liquid flows from conduit 37 through chamber 40 and into space 30b by way of duct 41, chamber outlet 42, and slot 27. Outlet 42 has the same length as slot 27.

An apparatus which is also useful for the present process is obtained by modifying the Example 2 apparatus so that the upper portion of chamber 40, instead of having a funnel shape as shown in FIG. VI, has the same width as the widest portion of chamber 40. The upper end of feeding means 36 is sealingly attached to wall 25a so that the liquid flows from chamber 40 through slot 27 in the direction specified in Example 1; thus, wall 25a becomes the top wall of chamber 40.

EXAMPLE 3

Referring to FIGS. IV and VII, the apparatus described in Example 1 is used to manufacture an organic isocyanate compound at a surprisingly high production rate and efficiency by (1) providing a solution in a solvent of an amine in which the amine/solvent ratio is 20/80, the solvent being orthodichlorobenzene (ODCB) and the amine being tolylene diamine; (2) placing the resulting solution in a storage vessel having a conduit attached to inlet means 28a and keeping the solution at 110° C.; (3) providing a solution in ODCB of phosgene and tolylene diisocyanate (TDI) having a TDI content of 11.4% and a phosgene content of 2.3%; (4) placing the Step 3 solution in a reservoir attached to means for feeding it to conduit 52 and inlet means 27a at 130° C., the source of the Step 3 solution after the first pass of the reaction mixture through the FIG. VII loop being the recycle stream flowing through conduits 46 and 48 and heat exchanger 51; (5) continuously feeding to annular space (reaction zone) 30b the solutions provided in Steps 1 and 3 in proportions such that for each part of amine being fed, there are fed 21 parts of phosgene and 104 parts of the isocyanate, the Step 1 amine solution being fed at the rate of 188 pounds per hour through inlet means 28a, and the Step 3 phosgene/isocyanate solution being fed at 34,000 pounds per hour at a uniform pressure slightly above the vessel pressure through inlet means 27a, in the direction specified for each inlet in Example 1, and the Step 3 solution thus being fed at a rate equal to about 180 times that of the Step 1 solution; (6) mixing the contents of zone 30b under high shear at a shear rate of 5600 reciprocal seconds while the contents of zone 30b are at a temperature of 130° C., while the pressure in the mixer is 45 p.s.i. absolute, while continuously moving the contents through zone 30b by clockwise rotation of rotor 30 at 750 r.p.m. (by a motor, not shown), and while thereby maintaining a phosgene partial pressure of 13 p.s.i. absolute in zone 30b; (7) continuously removing the resulting mixed and partially reacted material from zone 30b through outlet means 29a; (8) passing the removed material, which still contains ingredients capable of forming isocyanate, through conduit 53 into reservoir 45; (9) passing the material through reservoir 45 into conduit 46 while the material is kept at 130° C. under a pressure of 39.7 p.s.i. absolute, and covered with a gas containing phosgene, ODCB, and HCl, the residence time of the material in reservoir 45 being sufficient to give a total of about 230 pounds of reaction mixture in the entire loop; (10) removing most of the HCl by-product of the reaction from the material through condenser 54 as it passes through the reservoir, the material leaving the condenser containing about 33.3 mol percent phosgene, 66.7 mol percent HCl, and traces of ODCB; (11) removing about 1.3% of the material entering conduit 46 through port 55 and passing it through a heated vessel (equipped with a condenser for removing HCl) for one hour at 170° C. at atmospheric pressure to complete the isocyanate formation and then to a known isocyanate isolation means (e.g. a fractionating column) where the isocyanate compound is isolated; (12) passing the rest of the material in conduit 46 through centrifugal pump 47 into conduit 48; (13) as the material passes through conduit 48, adding 122 pounds per hour of liquid phosgene through inlet 49 and 235 pounds per hour of solvent (ODCB) through inlet 50; (14) passing the material through heat exchanger 51 until the material is at a temperature of 130° C., and then passing the material through conduit 52; and (15) repeating steps 5–14 until the desired amount of isocyanate compound has been produced.

In Step 1, the tolylene diamine is a mixture of about 77% 2,4-isomer, 20% 2,6-isomer, and 3% nonvolatile material.

In Steps 5 and 6 the amine solution enters into and rapidly mixes and reacts with the layer of liquid moving along reaction zone 30b. The contents of the thin layer of liquid in the reaction zone are efficiently mixed between the rotor and tubular wall by the great shear forces and turbulence created by the apparatus in the reaction zone. There is surprisingly little reaction of the amine with the isocyanate, and very little by-product is obtained.

In Step 7, most of the material flowing towards the outlet passes through outlet slot 29; the rest makes another pass through zone 30b.

In Step 9, the desired pressure in the reservoir can be regulated by regulating the amount of HCl gas in the reservoir. In Step 11, the fractionating column can be preceded by a packed tower stripper operating at 182–190° C. to remove HCl and phosgene.

Any phosgene and solvent recovered are returned to the loop at any convenient point, for example, by making them a part of the stream entering inlets 49 and 50. In Step 13, in other embodiments, if the isocyanate content of the material being recycled to the mixer is high enough the material being recycled to the mixer becomes high enough (e.g. upwards of 25%) to cause any undue amount of reaction of amine with isocyanate and resultant decrease in isocyanate yield, the rate of solvent flow through inlet 50 is increased enough to provide the desired dilution of the recycle stream.

In Step 13, the phosgene mixes with the recycle stream in conduit 48 at a pressure slightly above the pressure in the mixer. It will be noted that the phosgene is not allowed to come in contact with the amine until the phosgene and isocyanate streams are premixed.

When the material withdrawn from the loop through port 55 in Step 11 is heated at 170° C. for one hour at atmospheric pressure, and the TDI isolated therefrom by distillation, one obtains 11.5 parts of TDI for each part of nonvolatile residue on a solvent-free basis. The yield of TDI, therefore, is 92%.

By using the process described in Example 3, one can manufacture TDI at a high yield, high production rate, and low solvent consumption.

EXAMPLE 4

Another embodiment of the novel mixing apparatus is built as illustrated in FIG. III; as in Example 1, an end wall has been removed to show the mixer structure.

Referring to FIG. III, mixer/reactor 15 has:
(1) Cylindrical chamber 16 and rotor 20 similar to those of the FIG. IV mixer described in Example 1;
(2) Like the Example 1 mixer, a thin annular space between the outer end 21 of each rotor blade and the inner surface of tubular wall 22 during rotation of the rotor;
(3) Inlet means in the form of ducts 17 and 18 for the separate introduction of two fluids; and
(4) Outlet means in the form of duct 19 for removing fluid mixture.

The diameter of each duct is selected according to the needs of the process in which the mixer will be used. If desired, duct 17 can be replaced with a slot or a row of ducts capable of feeding a liquid into the annular space at numerous points along a narrow path in wall 22 which path is about as along as wall 22 and parallel with the rotor axis; for example, the inlet orifice can be like slot 27 or ducts 28 of FIG. IV. The same applies to duct 18. And outlet means 19 can be built in the same manner.

When operating the mixer, duct 17 introduces one liquid and duct 18 introduces another liquid into the annular space in the direction of rotor rotation (clockwise) parallel to a tangent on wall 22 at each duct inlet. And duct 19 removes liquid from the annular space in the direction of rotor rotation parallel to a tangent on wall 22 at the duct outlet.

EXAMPLE 5

TDI is prepared by using a modification of the Example 4 mixer wherein:

(a) Chamber 16 has a diameter of 1.5 inch and a length of one inch.

(b) The rotor has a diameter of 1.375 inch and a length of 0.94 inch.

(c) Inlet means 18 is composed of two ducts, each having a diameter of 0.06 inch; one is about 0.3 inch from one end of chamber 16 and the other about 0.3 inch from the other end, both being in a narrow path in wall 22 which is parallel with the rotor axis.

(d) Inlet means 17 is a duct having a diameter of 0.25 inch and located about 60 degrees counter-clockwise from inlet 18; it is built to feed a liquid radially into the reaction zone.

(e) Outlet means 19 is a ⅛ inch wide slot about as long as wall 22 and parallel with the rotor axis; it is located about ½ of the wall circumference from inlet 18.

Referring to FIGS. III and VII, the TDI is prepared by using a modification of the process described in Example 3 wherein:

In Step 1, the amine/solvent ratio is 25/75.

In Step 2, the amine solution vessel conduit is attached to inlet 18.

In Step 4, the phosgene/isocyanate solution is fed from conduit 52 to inlet 17 of the modified mixer described above at 110° C.

In Step 5, the amine solution feed rate is 8 pounds per hour through inlet 18, and the phosgene/isocyanate solution feed rate is 1,200 pounds per hour through inlet 17; for each part of amine fed, there are fed 25 parts of phosgene and about 100 parts of the isocyanate.

In Step 6, the shear rate is 2,350 reciprocal seconds, the temperature is 110° C., the mixer pressure is 40 p.s.i., the rotor speed is 2,040 r.p.m., and the phosgene partial pressure is 13 p.s.i.

In Step 7, the material leaves the reaction zone through outlet 19.

In step 9, the temperature is 110° C., and the amount of reaction mixture in the loop is 10 pounds.

In Step 13, 6.94 pounds per hour of phosgene and 7.27 pounds per hour of ODCB are added.

In step 14, the temperature is 110° C.

When the material withdrawn from the loop from port 55 is heated at 185° C. for 30 minutes at atmospheric pressure, and the TDI is isolated therefrom by distillation, the material is found to contain 16% TDI and 1.45% nonvolatile residue (about a 92% yield).

When Example 5 is repeated except the shear rate is 1,550 reciprocal seconds and the rotor speed is 1,340 r.p.m., the yield is 89%.

When Example 5 is repeated except the shear rate is 4,100 reciprocal seconds and the rotor speed is 3,550 r.p.m., the yield is 94.3%.

EXAMPLE 6

A mixer/reactor apparatus for use in Example 7 below is built as illustrated in FIGS. I and II wherein housing 1 is provided with inlets 2 and 3 leading to annular chambers 4 and 5, respectively, within the reactor. Tapered nipple 6 is vertically adjustable by rotation of handle 7 and screw means 8 so that it can be lowered into conical section 9 as shown in FIG. II to form annular gap 10, the size of the latter being regulated by the vertical adjustment of nipple 6.

Annular chamber 4 converges at its lower portion in a constricted horizontal passage 11 which merges with the lower section of gap 10 in outlet chamber 12 for exit to the exterior. The size of passage 11 is adjustable by turning bolt 13 to compress or expand flexible washer 14.

In operation, phosgene and isocyanate in an inert organic solvent are introduced into the mixing reactor through inlet 2; and amine in a suitable solvent, preferably the same solvent utilized for the phosgene, is introduced through inlet 3. The amine solution filling annular chamber 5 is forced through gap 10 at high velocity where it meets the phosgene/isocyanate solution leaving annular chamber 4 through passage 11. Passage 11 and gap 10 are adjusted to provide the desired shear rate between the contacting solutions. After contact, the mixed solutions exit through outlet chamber 12. By adjusting the pressure on the solutions entering the reactor and the size of gap 10 and passage 11, the desired shear rates are easily attained.

EXAMPLE 7

TDI is prepared by using the mixer described in Example 6 as follows. The FIG. VII type of loop reactor system described in Example 5 is used with the exception that mixer 15 is replaced with the mixer in FIGS. I and II. The 25% solution of tolylene diamine is fed continuously to the mixer through inlet 3 at a rate of 7.67 lbs./hr. The amine solution flow through gap 10, which is 0.25 inch in diameter and 0.001 inch wide. The recycled phosgenation mass from conduit 52 of FIG. VII enters the mixer inlet 2 at a rate of 1100 lbs./hr. and flows through passage 11, which is 0.50 inch in diameter and 0.040 inch wide. It is estimated that the shear rate at the point of amine addition is about 3000 reciprocal seconds. Liquid phosgene and ODCB are added continuously at inlets 49 and 50 as in Example 5 to the recirculating reaction mass at rates of 6.84 and 5.44 lbs./hr., respectively. After reaching steady-state, the yield is 92.4% when measured by distillation as in Example 5. Except as otherwise specified (and an isocyanate concentration of 17.8%), the conditions of pressure, temperature, and concentration are the same as in Example 5.

I claim:

1. A process for preparing an organic isocyanate compound which comprises:

(A) providing a solution in an organic solvent of an organic primary amine, the weight ratio of the amine to the solvent in the solution being about 5:95 to 50:50, (B) providing a solution in an organic solvent of enough phosgene and an isocyanate of an organic primary amine to provide the feed requirements of Step C given below, (C) continuously feeding to a reaction zone the amine solution provided in Step A and the phosgene/isocyanate solution provided in Step B in proportions such that for each part by weight of said amine being fed, there are fed at least 8 parts by weight of phosgene and about 25–150 parts by weight of the isocyanate, (D) while the contents of the reaction zone are at a temperature of about 85–180° C., while continuously moving the contents through the reaction zone, and while maintaining a phosgene partial pressure of about 3–100 p.s.i. absolute in the reaction zone, mixing the contents under high shear at a shear rate of at least 700 reciprocal seconds until substantially all of the amine has reacted with the mixture, (E) continuously removing the resulting mixed and at least partially reacted material from the reaction zone, and (F) isolating organic isocyanate compound from the removed material.

2. A process according to claim 1 wherein the material removed in Step E still contains ingredients capable of forming isocyanate compound, and prior to Step F said material is stored in a vessel at about 85–180° C. while covered with a gas having a phosgene content of about 1–100% by weight until additional organic isocyanate compound is formed.

3. A process according to claim 2 wherein at least some of the resulting stored material is subjected to conditions which cause hydrogen chloride removal, then the material is mixed with enough phosgene and solvent to form the Step B solution and Steps C, D, and E are repeated.

4. A process according to claim 1 wherein in Step C the solutions are fed into a reaction zone composed of an annular high-shear mixing zone which is formed between the tubular inner wall of a cylindrical vessel and the outer ends of the blades of a coaxial rotor rotating therein.

5. A process according to claim 4 wherein the annular mixing zone has a thickness equal to about 0.15–10% of the inside diameter of the vessel, and the pressure in the vessel is about 15–150 p.s.i. absolute.

6. A process according to claim 4 wherein at least one of the solutions specified in Step C is fed into the reaction zone at a substantially uniform rate at numerous points along a narrow path in said tubular wall which is about 80–100% as long as said wall and substantially parallel with the rotor axis.

7. A process according to claim 6 wherein the two solutions are fed through separate inlets, each of which define such a narrow path, into the reaction zone in a direction within the range of radial to substantially parallel to a tangent on the tubular wall at each inlet in the direction of rotor rotation.

8. A process according to claim 7 wherein the amine solution is fed in a direction within the range of radial to an angle in the direction of rotor rotation of about 30 degrees to said tangent, and the phosgene/isocyanate solution is fed in the direction of rotor rotation and within the range of substantially parallel to said tangent to an angle of about 45 degrees to said tangent.

9. A process according to claim 7 wherein the amine solution is fed to the reaction zone at a point located at an angular distance of about 10–90 degrees in the direction of rotor rotation from the point at which the phosgene/isocyanate solution is fed; and in Step E the material is removed from the reaction zone through a slot in the tubular wall which is about 80–100% as long as said wall, substantially parallel with the rotor axis, and located an angular distance of about 135–300 degrees in the direction of rotor rotation from the point at which the amine solution is fed.

10. A process according to claim 6 wherein the phosgene/isocyanate soltion is fed through a slot in the vessel wall which defines said narrow path.

11. A process according to claim 9 wherein the phosgene/isocyanate solution is fed at a rate equal to about 50–1000 times that of the amine solution.

12. A process according to claim 11 wherein the phosgene/isocyanate solution is fed at a rate equal to about 100–250 times that of the amine solution.

13. A process according to claim 10 wherein the amine solution is fed through a row of evenly-spaced equal-size ducts in the vessel wall which are in said narrow path.

14. A process according to claim 1 wherein the amine solution has an amine to solvent weight ratio of about 10:90 to 35:65 and the shear rate in Step D is at least 2000 reciprocal seconds.

15. A process according to claim 14 wherein the amount of phosgene fed in Step C is at least 15 parts per part of the amine.

16. A process according to claim 15 wherein the amount of isocyanate compound fed in Step C is about 75–125 parts per part of the amine.

17. A process acccording to claim 16 wherein a phosgene partial pressure of about 8–25 p.s.i. absolute is maintained in Step D.

18. A process according to claim 17 wherein the contents of the reaction zone are maintained at about 102–130- C. in Step D.

19. A process according to claim 17 wherein the amine is selected from the group: tolylene diamine, diamino diphenyl methane, and 4,4'-bis(aminocyclohexyl)methane.

20. A process according to claim 13 wherein the amine solution is fed through a row of ducts having a diameter of about 0.03–0.25 inch.

21. A process according to claim 20 wherein the distance between the resulting streams of amine solution passing through the ducts is about 0.02–2.0 inches measured from center to center of adjacent streams.

22. A process according to claim 6 wherein at least one of the solutions is fed into the reaction zone at a pressure which is substantially uniform at all points along said path and is slightly above the pressure in the vessel.

References Cited
UNITED STATES PATENTS

| | | | |
|---|---|---|---|
| 2,822,373 | 2/1958 | Beck | 260—453 |
| 3,287,387 | 11/1966 | Denton et al. | 260—453 |
| 3,321,283 | 5/1967 | Ewald | 260—453 X |
| 3,465,021 | 9/1969 | Nicholas et al. | 260—453 |
| 3,507,626 | 4/1970 | Van Horn | 260—453 X |

LEWIS GOTTS, Primary Examiner

D. H. TORRENCE, Assistant Examiner

U.S. Cl. X.R.

23—284; 259—10